United States Patent
Kwapien et al.

[11] Patent Number: 6,106,324
[45] Date of Patent: *Aug. 22, 2000

[54] PROGRAMMABLE TERMINATION STRIP FOR ELECTRIC MOTOR

[75] Inventors: Steven Kwapien, Thomaston; Michael Saman, Jr., Bristol; Arthur T. Westergren, Farmington, all of Conn.

[73] Assignee: Dana Corporation, Toledo, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/506,907

[22] Filed: Jul. 26, 1995

[51] Int. Cl.$^7$ ........................................................ H01R 4/24
[52] U.S. Cl. .............................. 439/398; 310/71; 29/596
[58] Field of Search ................................... 439/395, 398, 439/45, 43, 52, 54; 310/71; 29/596

[56] References Cited

U.S. PATENT DOCUMENTS

| | | | |
|---|---|---|---|
| 3,979,615 | 9/1976 | Neff | 310/71 |
| 4,038,573 | 7/1977 | Hillyer et al. | 439/395 |
| 4,132,460 | 1/1979 | Porta | 439/575 |
| 4,181,393 | 1/1980 | Lill | 310/71 |
| 4,481,435 | 11/1984 | Loforese | 310/71 |
| 4,642,885 | 2/1987 | King | 310/71 |
| 4,656,378 | 4/1987 | Atherton et al. | 310/71 |
| 4,689,023 | 8/1987 | Strong, III et al. | 310/71 |
| 4,707,627 | 11/1987 | Best | 310/71 |
| 4,880,391 | 11/1989 | Hurtgen | 439/221 |
| 4,937,482 | 6/1990 | Dohogne | 310/71 |
| 5,015,894 | 5/1991 | Crow et al. | 310/71 |
| 5,175,458 | 12/1992 | Lemmer et al. | 310/71 |
| 5,331,240 | 7/1994 | Hyodo | 310/71 |
| 5,465,016 | 11/1995 | Mancl et al. | 310/71 |

FOREIGN PATENT DOCUMENTS 0 155 573 9/1985 European Pat. Off. .

*Primary Examiner*—Gary F. Paumen
*Assistant Examiner*—Tho D. Ta
*Attorney, Agent, or Firm*—MacMillan, Sobanski & Todd, LLC

[57] ABSTRACT

A programmable terminal strip for connecting the internal electrical conductors of an electrical device, such as the phase windings of an electric motor, with a plurality of external electrical conductors includes a plurality of pockets formed thereon. Each of the pockets is provided to form a terminal for the programmable terminal strip. To accomplish this, one end of one of the internal electrical conductors is connected to a wire terminal member installed within the pocket so as to provide an electrical connection therebetween. A plurality of external electrical conductor and terminal assemblies are provided for use with the programmable terminal strip. A first embodiment of the external conductor assembly includes an insulated external electrical conductor wire having a metallic wire terminal member secured thereto. The wire terminal member is adapted to be inserted into the pocket to provide an electrical connection therebetween. A second embodiment of the external electrical conductor and terminal assembly includes an insulated external electrical conductor wire having a first metallic wire terminal member secured thereto. However, a jumper wire is also connected to the first wire terminal member, and a second wire terminal member is connected to the end of the jumper wire. The wire terminal members are adapted to be inserted into the pockets to provide electrical connections therebetween. The external electrical conductor and terminal assemblies can be connected in a number of different ways to the programmable terminal assembly to permit the electric motor to be operated in a number of different operating modes.

18 Claims, 4 Drawing Sheets

PROGRAMMABLE TERMINATION STRIP FOR ELECTRIC MOTOR

BACKGROUND OF THE INVENTION

This invention relates in general to an interface structure for selectively connecting a plurality of internal electrical conductors contained within an electrical device to a plurality of external electrical conductors so as to facilitate use of the electrical device in a number of different operating modes. More specifically, this invention relates to a programmable terminal strip for a wound and terminated stator of an electric motor which connects a plurality of internal phase windings to a plurality of external leads so as to facilitate use of the electric motor in a number of different operating modes.

Electric motors are well known electrical devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. However, the two basic components of most conventional motors are (1) a stationary member which generates a rotating electromagnetic field, generally referred to as the stator, and (2) a rotatable member driven by the rotating magnetic field, generally referred to as the rotor.

In electric motors, as in many other diverse electrical devices, a plurality of internal electrical conductors are provided within the device which must be connected to a plurality of external electrical conductors in order for the device to operate. In the context of electric motors, a plurality of internal electrical conductors is provided within the motor. The internal electrical conductors are typically embodied as a plurality of phase windings on the stator of the motor. Similarly, a plurality of external electrical conductors is provided outside of the motor. The external electrical conductors are typically embodied as a plurality of leads connected to a source of electrical energy. To connect the internal electrical conductors to external electrical conductors and thereby permit operation of the motor, an interface structure is usually provided. The interface structure connects the source of electrical energy to the phase windings of the motor to permit operation thereof.

In some electric motors, the interface structure is a fixed terminal board which provides a secure but unchangeable connection between the internal and external electrical conductors. Although such fixed interface structures are relatively easy to manufacture and assemble, they suffer from the inability to change the connections between the internal and external electrical conductors to permit the motor to be operated in different operating modes. As a result, a plurality of relatively similar motors must be manufactured and inventoried to accommodate all of the different desired operating modes. This result is obviously uneconomical. To address this, it is also known in the art to provide a non-fixed terminal board connection between the internal and external electrical conductors of a motor. Unfortunately, known terminal boards which are changeable have been found to be relatively difficult to change between operating modes or relatively complicated or expensive. Accordingly, it would be desirable to provide an improved structure for a terminal board for an electric motor or other electrical device which permits the changing of operating modes easily and which is relatively simple and inexpensive in structure.

SUMMARY OF THE INVENTION

This invention relates to an interface structure for selectively connecting a plurality of internal electrical conductors contained within an electrical device, such as the phase windings of an electric motor, to a plurality of external electrical conductors, such as leads connected to a source of electrical energy, so as to facilitate use of the electrical device in a number of different operating modes. The interface structure includes a programmable terminal strip which connects the internal electrical conductors with a plurality of external electrical conductors. A plurality of pockets are formed on the programmable terminal strip. Each of the pockets is provided to form a terminal for the programmable terminal strip. To accomplish this, one end of one of the internal electrical conductors is connected to a wire terminal member installed within the pocket so as to provide an electrical connection therebetween. A plurality of external electrical conductor and terminal assemblies are provided for use with the programmable terminal strip. A first embodiment of the external conductor assembly includes an insulated external electrical conductor wire having a metallic wire terminal member secured thereto. The wire terminal member is adapted to be inserted into the pocket to provide an electrical connection therebetween. A second embodiment of the external electrical conductor and terminal assembly includes an insulated external electrical conductor wire having a first metallic wire terminal member secured thereto. However, a jumper wire is also connected to the first wire terminal member, and a second wire terminal member is connected to the end of the jumper wire. The wire terminal members are adapted to be inserted into the pockets to provide electrical connections therebetween. The external electrical conductor and terminal assemblies can be connected in a number of different ways to the programmable terminal assembly to permit the electric motor to be operated in a number of different operating modes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
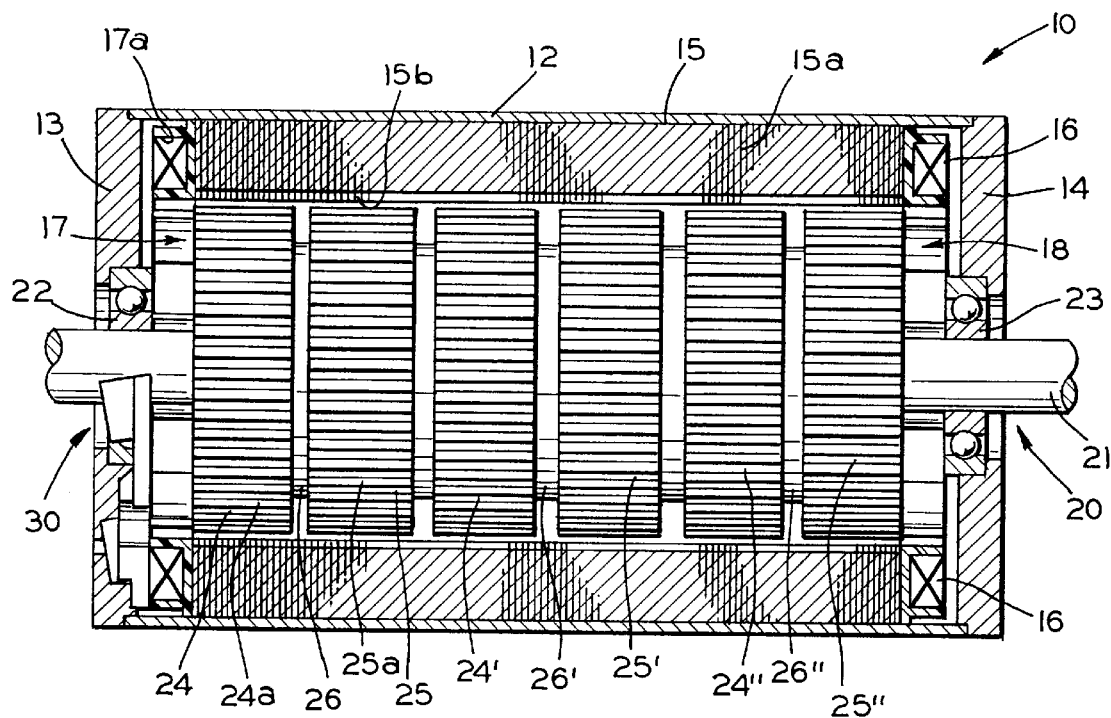
FIG. 1 is a sectional elevational view of an electric motor including a programmable terminal strip in accordance with this invention.

Referring now to the drawings, there is illustrated in FIG. 1 a sectional elevational view of an electric motor, indicated generally at 10, in accordance with this invention. The illustrated electric motor 10 is a synchronous inductor motor, the basic structure and operation of which are well known in the art. For example, U.S. Pat. No. 4,406,958, owned by the assignee of this invention, discloses a synchronous inductor electric motor which can be operated as a stepping motor. The disclosure of that patent is incorporated herein by reference. Thus, only those portions of the electric motor 10 which are necessary for a complete understanding of this invention will be described and illustrated. Although this invention will be described and illustrated in the context of the illustrated synchronous inductor electric motor 10, it will be appreciated that this invention may be used with other types of electric motors.

Figure 2:
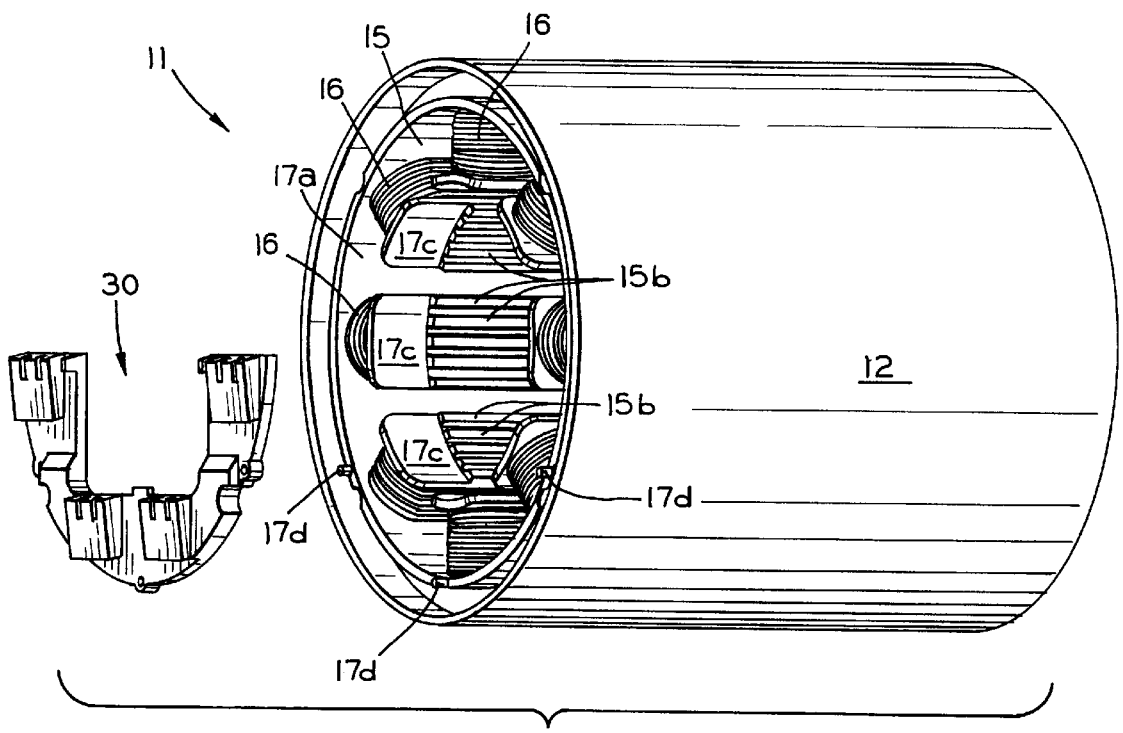
FIG. 2 is an exploded perspective view of the stator assembly and the programmable termination strip of the electric motor illustrated in FIG. 1.

The electric motor 10 includes a stator assembly, indicated generally at 11 in FIG. 2. The stator assembly 11 includes a hollow cylindrical shell 12 which extends axially between a pair of opposed end bells 13 and 14. The end bells 13 and 14 are piloted on the opposed ends of the shell 12 so as to form a protective enclosure for the other components of the stator assembly 11. The stator assembly 11 further includes a hollow cylindrical stator 15 which is generally hollow and cylindrical in shape. The illustrated stator 15 is mounted within the stator shell 12 and has a plurality of radially inwardly extending poles 15a formed thereon. In the illustrated embodiment, the stator 15 is formed having eight of such stator poles 15a, although a greater or lesser number may be provided. The innermost end of each of the stator poles 15a has a plurality of teeth 15b formed thereon. In the illustrated embodiment, each of the stator poles 15a is formed having five of such teeth 15b, although a greater or lesser number may be provided. The stator poles 15a may extend longitudinally throughout the length of the motor. As discussed above, the illustrated electric motor 10 is a synchronous inductor electric motor. Thus, the stator 15, the stator poles 15a, and the stator teeth 15b are formed from a magnetically permeable material.

A winding 16 of an electrical conductor is provided about each of the stator poles 15a. The windings 16 may be monofilar (i.e., composed of a single electrical conductor which is wound in a single direction about the stator pole 15a) or bifilar (i.e., composed of two electrical conductors which are wound in opposite directions about the stator pole 15a) as desired. Each of the windings 16 may be provided on the stator poles 15a independently of one another. Alternatively, and more commonly, some of the windings 16 may be connected together either in series or in parallel. In the illustrated embodiment, the windings 16 are bifilar, and the windings 16 on alternating ones of the stator poles 15a are connected in series together. To accomplish this, a first internal electrical conductor is provided within the stator 15 which is wound in a first direction about the first, third, fifth, and seventh stator poles 15a. A second internal electrical conductor is provided within the stator 15 which is wound in a second direction (opposite to the first direction) about the first, third, fifth, and seventh stator poles 15a. Similarly, a third internal electrical conductor is provided within the stator 15 which is wound in the first direction about the second, fourth, sixth, and eighth stator poles 15a, and a fourth internal electrical conductor is provided within the stator 15 which is wound in the second direction about the second, fourth, sixth, and eighth stator poles 15a. In a manner which is well known in the art, pulses of electrical current can be passed through each of the windings 16 so as to magnetize the stator poles 15a to possess either a magnetic north or a magnetic south polarization.

To facilitate the winding of the internal electrical conductors about the stator poles 15a to form the windings 16, a pair of end forms, indicated generally at 17 and 18, are provided adjacent to the axial ends of the stator 15. The structure of the end form 17 is illustrated in detail in FIG. 3. The end form 17 is generally hollow and cylindrical in shape and is preferably formed from an electrically non-conductive material, such as molded plastic. The end form 17 has an outer flange 17a formed about the outer circumference thereof which extends axially away from the stator 15. The end form 17 further includes a plurality of radially inwardly extending legs 17b which correspond in size, shape, and location to the stator poles 15a. Each of the legs 17b of the end form 17 terminates in an inner flange 17c which extends axially away from the stator 15. As best shown in FIGS. 1 and 2, the outer flange 17a cooperates with each of the inner flanges 17c to define a winding cavity at the axial ends of the stator poles 15a. The end form 18 is formed in a similar manner. The winding cavities defined on the end forms 17 and 18 facilitate the winding of the internal electrical conductors about the stator poles 15a to form the windings 16.

Figure 3:
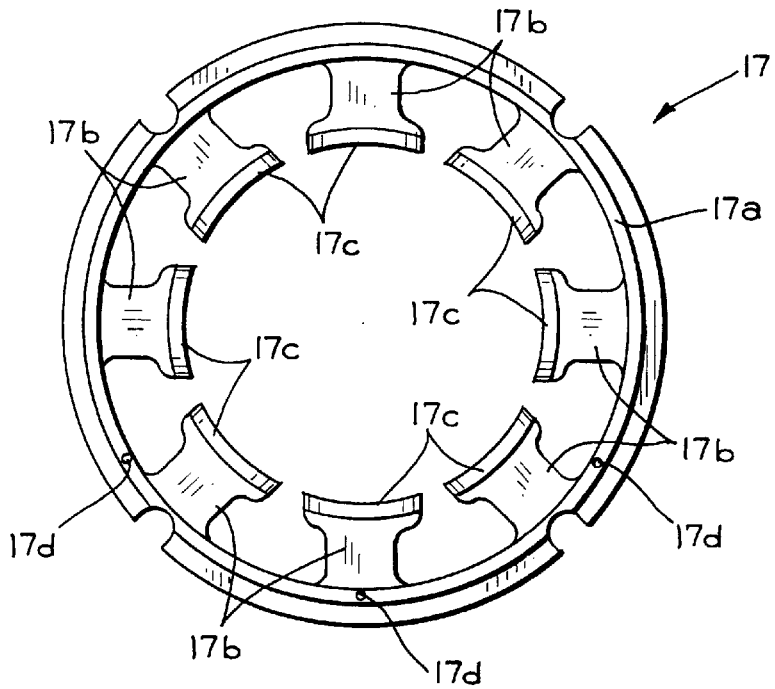
FIG. 3 is an enlarged end elevational view of one of the end forms of the stator assembly illustrated in FIGS. 1 and 2.

As shown in FIGS. 2 and 3, the end form 17 has a plurality of posts 17d formed thereon. In the illustrated embodiment, three cylindrical posts 17d are formed on the end form 17 and extend axially away from the stator 15. However, a greater or lesser number of posts 17d may be provided on the end form 17, and the posts 17d may be formed in any desired shape. Similar posts need not be formed on the other end form 18. The purpose of these posts 17d will be explained below.

The electric motor 10 further includes a rotor assembly, indicated generally at 20 in FIG. 1. The illustrated rotor assembly 20 is generally cylindrical in shape, including a shaft 21 which is rotatably supported within the end bells 17 and 18 by respective bearings 22 and 23. A first pair of pole pieces 24 and 25 are mounted on the shaft 21 for rotation therewith. Each of the pole pieces 24 and 25 has a plurality of teeth 24a and 25a (indicated by cross hatching for clarity) formed thereon. As discussed above, the illustrated electric motor 10 is a synchronous inductor electric motor. Thus, the pole pieces 24 and 25, as well as their respective teeth 24a and 25a, are formed from a magnetically permeable material. The teeth 24a formed on the first pole piece 24 are aligned with the valleys between the teeth 25a formed on the second pole piece 25.

A permanent magnet disc 26 is disposed between the pole pieces 24 and 25 and is mounted on the shaft 21 for rotation therewith. The permanent magnet disc 26 is provided to magnetize the pole pieces 24 and 25 to possess opposite magnetic polarizations. Similarly, a second pair of pole pieces 24' and 25' having a permanent magnet disc 26' disposed therebetween and a third pair of pole pieces 24" and 25" having a permanent magnet disc 26" disposed therebetween are mounted on the shaft 21 for rotation therewith. In operation, the stator poles 15a are selectively polarized in a sequential manner by the windings 16 so as to create a rotating electromagnetic field which causes the permanently polarized teeth 24a and 25a of the rotor pole pieces 24 and 25 to be sequentially attracted to and repelled from the stator teeth 15b to cause rotation of the rotor assembly 20 relative to the stator assembly 15.

As discussed above, the illustrated electric motor 10 is provided with four internal electrical conductors which form the windings 16. Each of the internal electrical conductors 16 has two ends. Thus, a total of eight connections must be made between the internal electrical conductors and a source of electrical energy (not shown) in order for the electric motor 10 to operate. To accomplish this, a programmable terminal strip, indicated generally at 30, is provided to connect the internal electrical conductors with a plurality of external electrical conductors which, in turn, are connected to the source of electrical energy.

Figure 4:
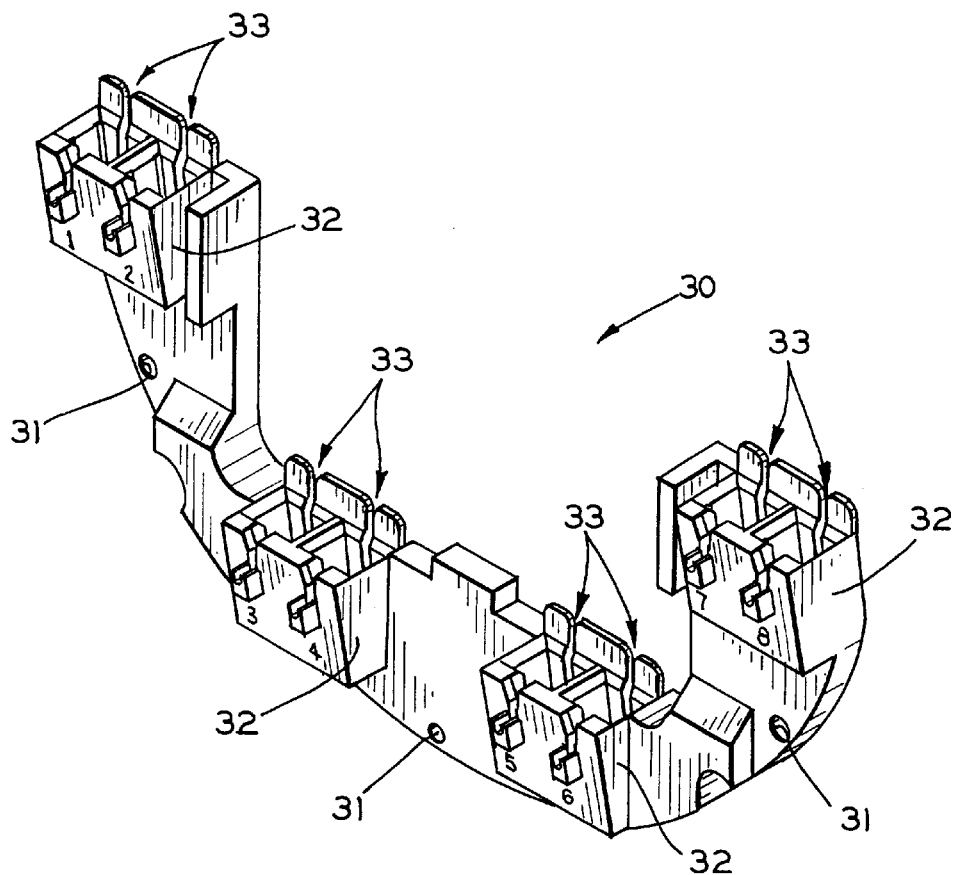
FIG. 4 is an enlarged perspective view of the programmable termination strip of the stator assembly illustrated in FIGS. 1 and 2.
Figure 5:
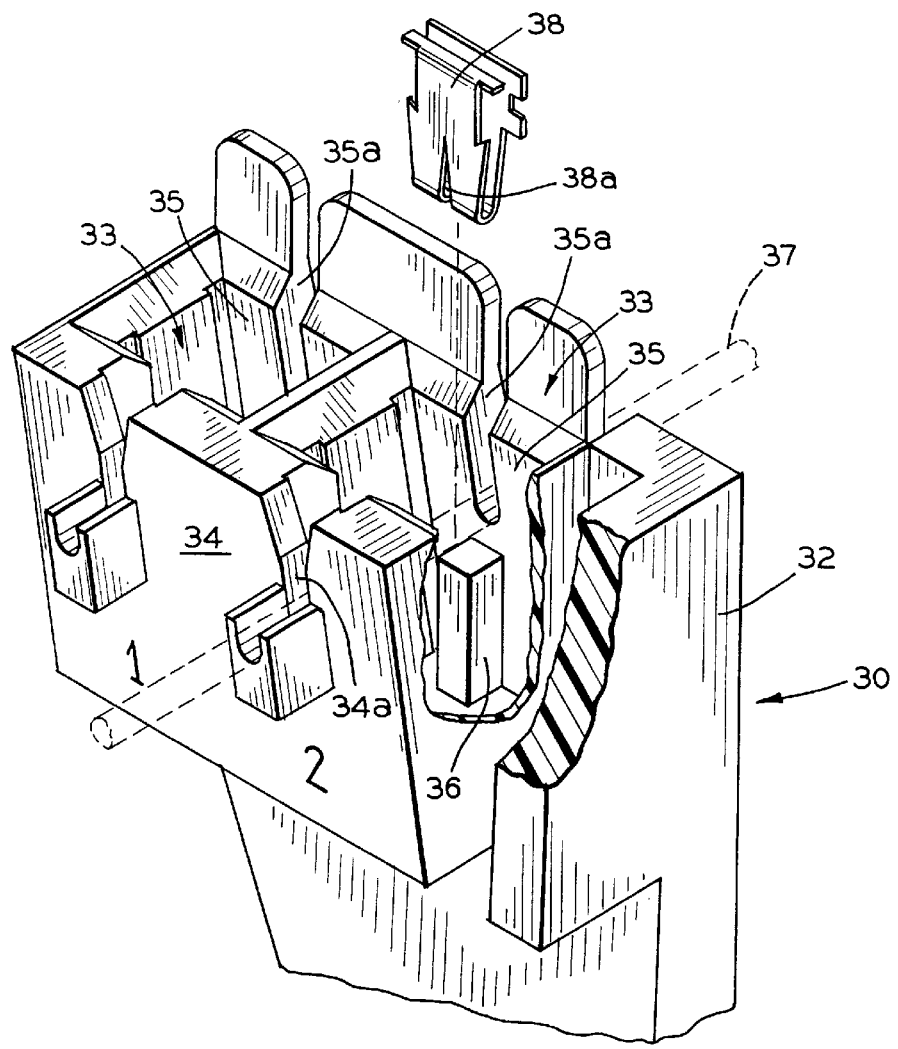
FIG. 5 is a further enlarged and exploded perspective view of a portion of the programmable termination strip, partially broken away for clarity, showing a pair of electrical terminals.

The structure of the programmable terminal strip 30 is best shown in FIGS. 4 and 5. As shown therein, the programmable terminal strip 30 is generally flat and semi-cylindrical in shape and is preferably formed from an electrically nonconductive material, such as molded plastic. The programmable terminal strip 30 has a plurality of openings 31 formed therethough. In the illustrated embodiment, three cylindrical openings 31 are formed through the programmable terminal strip 30. The openings 31 correspond in size, shape, and location to the posts 17d provided on the end form 17. Thus, the programmable terminal strip 30 can be installed on the end form 17 by moving the programmable terminal strip 30 axially toward the end form 17 such that the posts 17d are received within the openings 31. Preferably, the posts 17d engage the programmable terminal strip 30 in a friction fit relationship to retain the programmable terminal strip 30 on the end form 17d and the remainder of the stator assembly 15.

Four enlarged portions 32 are formed on the programmable terminal strip 30. As best shown in FIG. 5, each of the enlarged portions 32 has a pair of pockets, indicated generally at 33, formed therein. Each of the pockets 33 extends between an axially forward surface 34 and an axially rearward surface 35. The axially forward surface 34 is slightly angled (preferably at an angle of approximately ten degrees) from a plane defined by the axially rearward surface 35 and the remainder of the programmable terminal strip 30. The axially forward surface 34 is angled so as to provide clearance between the shell 12 and external equipment (not shown) used to terminate the windings 16. A slot 34a is formed through the axially forward surface 34, and a slot 35a is formed through the axially rearward surface 35. Also, an upstanding support block 36 is formed integrally within the pocket 33.

Each of the pockets 33 is provided to form a terminal for the programmable terminal strip 30. To accomplish this, one end of one of the internal electrical conductors, such as shown in dotted lines at 37 in FIG. 5, is pulled down through the slots 34a and 35a so as to extend axially through the pocket 33, above the support block 36. Then, a wire terminal member 38 is installed within the pocket 33 so as to engage the internal electrical conductor 37 so as to provide an electrical connection therebetween. The wire terminal member 38 may be embodied as any one of a number of conventional metallic terminal components, such as a Mag-Mate® brand poke-in terminal manufactured by AMP Corporation. The illustrated wire terminal member 38 is formed from a metallic material and has a V-shaped slot 38a formed therein. When the wire terminal member 38 is pushed downwardly within the pocket 33, the internal electrical conductor 37 is received within the V-shaped slot 38a. However, the internal electrical conductor 37 is supported on the support block 36, thereby preventing it from bending downwardly within pocket 33 as the wire terminal member 38 is installed. The edges of the V-shaped slot 38a are sharpened so as to slice through any electrical insulation provided on the internal electrical conductor 37, thereby assuring a good electrical contact between the conductor 37 and the wire terminal member 38. Any portion of the internal electrical conductor 37 which extends forwardly from the axially forward surface 34 can be trimmed off. The remaining seven ends of the four internal electrical conductors of the stator assembly 15 can be secured to the programmable terminal strip 30 in the same manner. Thus, it can be seen that the eight ends of the four internal electrical conductors of the stator assembly 15 are permanently terminated in the eight pockets 33 of the programmable terminal strip 30.

Figure 6:
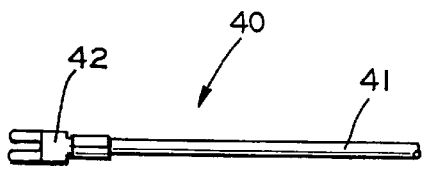
FIG. 6 is an elevational view of a first embodiment of an external electrical conductor and terminal assembly adapted for use with the programmable terminal assembly.

Referring now to FIG. 6, there is illustrated a first embodiment of an external electrical conductor and terminal assembly, indicated generally at 40, which is adapted for use with the above-described programmable terminal strip 30. The external conductor assembly 40 includes an insulated external electrical conductor wire 41 having a metallic wire terminal member 42 secured thereto. The wire terminal member 42 may be embodied as any one of a number of conventional metallic terminal components, such as a Mag-Mate® brand poke-in terminal manufactured by AMP Corporation which is complementary to the wire terminal member 38 discussed above. The wire 41 is connected to a source of electrical energy (not shown) in any known manner.

Figure 7:
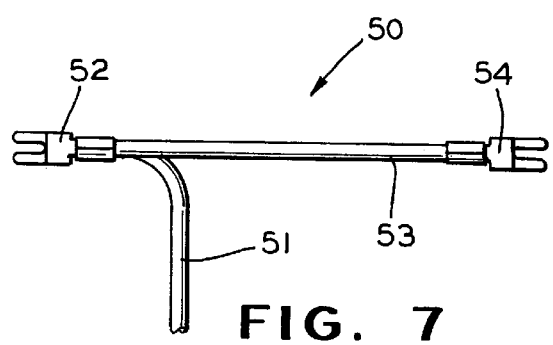
FIG. 7 is an elevational view of a second embodiment of an external electrical conductor and terminal assembly adapted for use with the programmable terminal assembly.

Referring now to FIG. 7, there is illustrated a second embodiment of an external electrical conductor and terminal assembly, indicated generally at 50, which is also adapted for use with the above-described programmable terminal strip 30. The external conductor assembly 50 includes an insulated external electrical conductor wire 51 having a first metallic wire terminal member 52 secured thereto, similar to the external conductor assembly 40. However, a jumper portion 53 is also connected to the first wire terminal member 52. The jumper portion 53 terminates in a second wire terminal member 54. The wire 51 is also connected to the source of electrical energy in any known manner.

Figure 8:
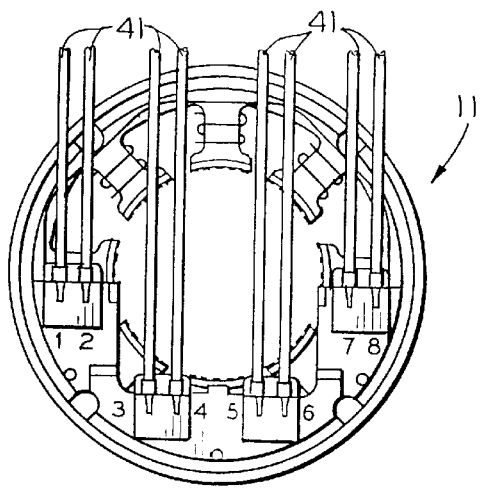
FIGS. 8 through 13 are end elevational views of the stator assembly illustrating different connections which can be made with the external electrical conductors illustrated in FIGS. 6 and 7 so as to operate the electric motor in a plurality of different operating modes.

Referring now to FIG. 8, there is illustrated an end elevational view of the stator assembly 11 showing the electric motor 10 connected for operation in a first operating mode. As shown therein, one of the first external conductor assemblies 40 illustrated in FIG. 6 is inserted within each of the eight pockets 33 so as to be electrically connected to the respective wire terminal members 38 disposed therein. As a result, the internal electrical conductors 37 are individually electrically connected to the external electrical conductors 42. This configuration is suited for using the electric motor 10 in a standard eight lead operating mode.

Figure 9:
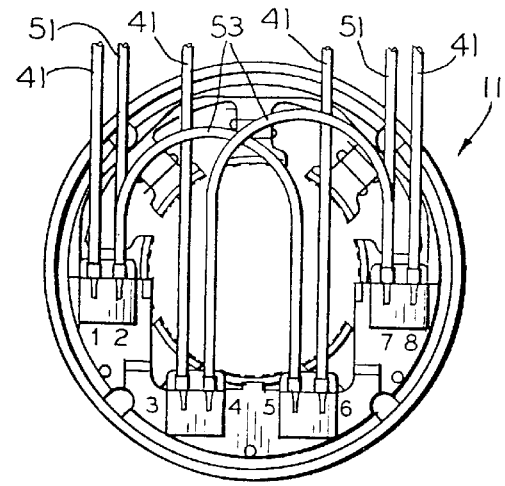

FIG. 9 illustrates an end elevational view of the stator assembly 11 showing the electric motor 10 connected for operation in a second operating mode. As shown therein, one of the first external conductor assemblies 40 illustrated in FIG. 6 is inserted with four of the eight pockets 33 so as to be electrical connected to the respective wire terminal members 38 disposed therein. As a result, four of the internal electrical conductors 37 are individually electrically connected to four of the external electrical conductors 42 (identified as terminals 1, 3, 6, and 8). Additionally, one of the second external conductor assemblies 50 illustrated in FIG. 7 is inserted within two of the eight pockets 33 so as to be electrically connected to the respective wire terminal members 38 disposed therein (identified as terminals 2 and 7). The jumper portions 53 associated with the second external conductor assemblies 50 are inserted within the remaining two of the eight pockets 33 so as to be electrically connected to the respective wire terminal members 38 disposed therein (identified as terminals 4 and 5). As a result, the internal electrical conductors 37 connected to terminals 2 and 5 are individually electrically connected to one of the external electrical conductors assemblies 50, and the internal electrical conductors 37 connected to terminals 4 and 7 are individually electrically connected to one of the external electrical conductors 42. This configuration is suited for using the electric motor 10 in a standard six lead operating mode.

Figure 10:
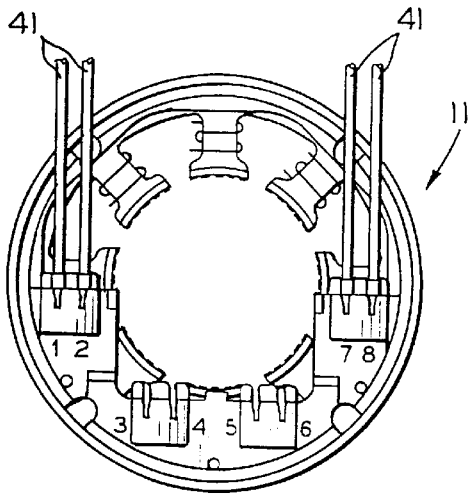
Figure 11:
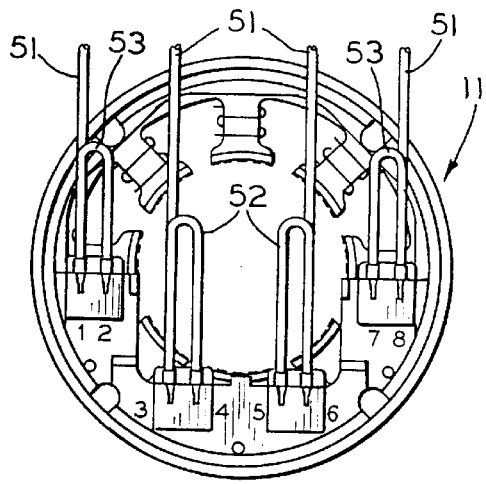
Figure 12:
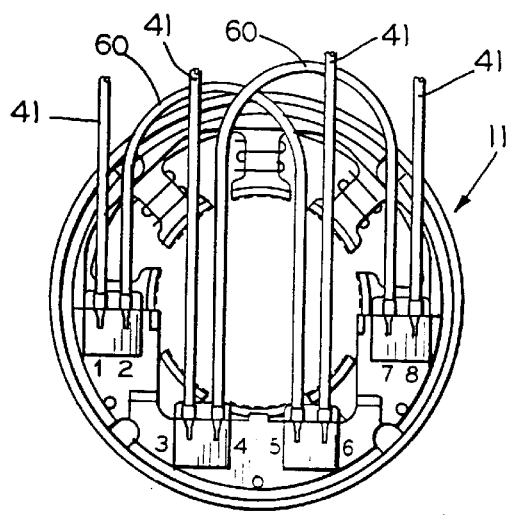
Figure 13:
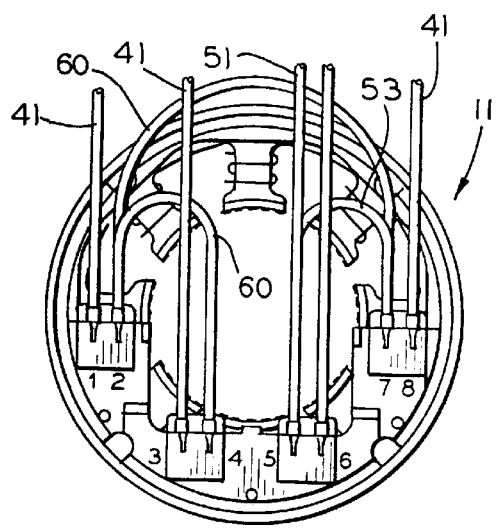

FIGS. 10 through 13 show the electric motor 10 connected for operation in other operating modes. FIG. 10 illustrates a configuration which is suited for using the electric motor 10 in a standard four lead monofilar operating mode. Also, which respect to the FIG. 10 configuration, if the first and second terminals are connected together by a conventional jumper wire (not shown), the electric motor 10 can be used in a standard three lead configuration. FIG. 11 illustrates a configuration which is suited for using the electric motor 10 in a four lead parallel termination operating mode. FIG. 12 illustrates a configuration which is suited for using the electric motor 10 in a four lead series termination operating mode. Lastly, FIG. 13 illustrates a configuration which is suited for using the electric motor 10 in a standard five lead operating mode. In FIGS. 12 and 13, conventional jumper wires 60 are provided between some of the terminals.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. An electric motor comprising:
    a hollow cylindrical stator including a plurality of inwardly extending stator poles, each of said stator poles having an internal electrical conductor wound thereabout to form a winding having first and second ends;
    a cylindrical rotor rotatably mounted within said stator, said rotor including a plurality of outwardly extending rotor poles;
    a terminal strip connected to said stator, said terminal strip including a plurality of internal wire terminal members that are respectively connected to said first and second ends of said windings; and
    a plurality of external electrical conductor and terminal assemblies, each of said external electrical conductor and terminal assemblies including an external electrical conductor wire and an external wire terminal member, said external electrical conductor wires adapted to be connected to a source of electrical energy, said external wire terminal members being selectively connected to said internal wire terminal members so as to connect said windings in a desired manner to said external electrical conductor wires, at least one of said external electrical conductor and terminal assemblies being simultaneously connected to at least two of said internal wire terminal members.

2. The electric motor defined in claim 1 further including an end form connected to said stator, said terminal strip being connected to said end form.

3. The electric motor defined in claim 1 wherein at least one of said external electrical conductor and terminal assemblies including an external electrical conductor wire and a pair of external wire terminal members, said pair of external wire terminal members being selectively connected to a pair of said internal wire terminal members so as to connect said windings in a desired manner to said external electrical conductor wires.

4. The electric motor defined in claim 1 wherein said stator defines an axis of rotation, said rotor is rotatably mounted within said stator for rotation about said axis of rotation, said internal wire terminal members are oriented in a plane that extends generally perpendicular to said axis of rotation, and external wire terminal members are selectively connected to said internal wire terminal members in said plane so as to connect said windings in a desired manner to said external electrical conductor wires.

5. The electric motor defined in claim 1 wherein said terminal strip has a plurality of pockets formed therein, and wherein said plurality of internal wire terminal members are disposed in said plurality of pockets.

6. The electric motor defined in claim 5 wherein each of said pockets includes a forward surface connected to a rearward surface by opposite side surfaces, and wherein aligned slots are formed in said forward and rear surfaces that receive said first and ends of said internal electrical conductors therein.

7. The electric motor defined in claim 6 wherein each of said pockets includes a forward surface that is angled relative to said rearward surface.

8. The electric motor defined in claim 1 wherein said stator has a plurality of posts formed thereon and wherein said terminal strip has a plurality of openings formed therein, said posts extending through said openings to connect said terminal strip to said stator.

9. The electric motor defined in claim 8 wherein said openings correspond in size, shape, and location to said posts such that a friction fit relationship is provided between said terminal strip and said stator.

10. An electric motor comprising:
    a hollow cylindrical stator defining an axis of rotation and including a plurality of inwardly extending stator poles, each of said stator poles having an internal electrical conductor wound thereabout to form a winding having first and second ends,
    a cylindrical rotor rotatably mounted within said stator for rotation about said axis of rotation, said rotor including a plurality of outwardly extending rotor poles;
    a terminal strip connected to said stator, said terminal strip including a plurality of internal wire terminal members that are respectively connected to said first and second ends of said windings, said internal wire terminal members being oriented in a plane that extends generally perpendicular to said axis of rotation; and
    a plurality of external electrical conductor and terminal assemblies, each of said external electrical conductor and terminal assemblies including an external electrical conductor wire and an external wire terminal member, said external electrical conductor wires adapted to be connected to a source of electrical energy, said external wire terminal members being selectively connected to said internal wire terminal members in said plane so as to connect said windings in a desired manner to said external electrical conductor wires.

11. The electric motor defined in claim 10 further including an end form connected to said stator, said terminal strip being connected to said end form.

12. The electric motor defined in claim 10 wherein at least one of said external electrical conductor and terminal assemblies including an external electrical conductor wire and a pair of external wire terminal members, said pair of external wire terminal members being selectively connected to a pair of said internal wire terminal members so as to connect said windings in a desired manner to said external electrical conductor wires.

13. The electric motor defined in claim 10 wherein at least one of said external electrical conductor and terminal assemblies is simultaneously connected to at least two of said internal wire terminal members.

14. The electric motor defined in claim 10 wherein said terminal strip has a plurality of pockets formed therein, and wherein said plurality of internal wire terminal members are disposed in said plurality of pockets.

15. The electric motor defined in claim 14 wherein each of said pockets includes a forward surface connected to a rearward surface by opposite side surfaces, and wherein aligned slots are formed in said forward and rear surfaces that receive said first and ends of said internal electrical conductors therein.

16. The electric motor defined in claim 15 wherein each of said pockets includes a forward surface that is angled relative to said rearward surface.

17. The electric motor defined in claim 10 wherein said stator has a plurality of posts formed thereon and wherein said terminal strip has a plurality of openings formed therein, said posts extending through said openings to connect said terminal strip to said stator.

18. The electric motor defined in claim 17 wherein said openings correspond in size, shape, and location to said posts such that a friction fit relationship is provided between said terminal strip and said stator.

* * * * *